US009921612B2

(12) United States Patent
Tucker et al.

(10) Patent No.: US 9,921,612 B2
(45) Date of Patent: Mar. 20, 2018

(54) VARIABLE FRICTION HINGE FOR ELECTRONIC DEVICES

(71) Applicant: Lenovo (Singapore) Pte. Ltd., Singapore (SG)

(72) Inventors: Matthew Ian Tucker, Durham, NC (US); Ali Kathryn Ent, Raleigh, NC (US); Cuong Huy Truong, Cary, NC (US)

(73) Assignee: Lenovo (Singapore) Pte. Ltd., Singaproe (SG)

( * ) Notice: Subject to any disclaimer, the term of this patent is extended or adjusted under 35 U.S.C. 154(b) by 0 days.

(21) Appl. No.: 15/238,155

(22) Filed: Aug. 16, 2016

(65) Prior Publication Data

US 2018/0052496 A1    Feb. 22, 2018

(51) Int. Cl.
*G06F 1/16*  (2006.01)
*G06K 9/00*  (2006.01)

(52) U.S. Cl.
CPC .......... *G06F 1/1681* (2013.01); *G06F 1/1616* (2013.01); *G06K 9/00013* (2013.01)

(58) Field of Classification Search
CPC .. G06F 1/1681; G06F 1/1616; G06K 9/00013
USPC ........................................................ 340/2.23
See application file for complete search history.

(56) References Cited

U.S. PATENT DOCUMENTS

| 5,714,808 | A | * | 2/1998 | Ansel | F21V 23/04 307/112 |
| 8,413,302 | B2 | | 4/2013 | Kitagawa et al. | |
| 2005/0091928 | A1 | * | 5/2005 | Okulov | E05F 15/74 49/341 |
| 2006/0251457 | A1 | * | 11/2006 | Lapstun | B41J 3/445 400/88 |
| 2009/0270765 | A1 | * | 10/2009 | Ghesquiere | A61B 5/14532 600/583 |
| 2017/0017273 | A1 | * | 1/2017 | Weldon | G06F 1/1654 |
| 2017/0139442 | A1 | * | 5/2017 | Yoshizumi | G04G 9/04 |

* cited by examiner

*Primary Examiner* — Allen T Cao
(74) *Attorney, Agent, or Firm* — Ference & Associates LLC (57) ABSTRACT

An embodiment provides a method, including detecting, using a touch sensor, a touch input; and operating, using a control unit, a variable friction hinge to achieve a low friction mode in response to the touch input. Other aspects are described and claimed.

17 Claims, 5 Drawing Sheets

VARIABLE FRICTION HINGE FOR ELECTRONIC DEVICES

BACKGROUND

As electronic devices having a lid that opens, closes or repositions about a hinge or hinges (e.g., a clamshell laptop computer) become lighter, it becomes more difficult to open the lid of the device, e.g., using one finger. That is because the bottom half of the devices, which were once quite heavy, are now light enough that when a user tries to open the lid with one finger, they end up lifting not only the upper part (e.g., screen half of a laptop) but also the bottom part (e.g., keyboard containing part of the laptop).

This difficulty is in part due to the friction in device hinges remaining constant, even as devices become lighter. Most thin computers now require at least one finger to hold the bottom half of the computer down and another finger, usually on the user's opposite hand, to lift the lid.

In order to make it easier to lift the lid with one finger, leaving the other hand free, some computers have hinges with relatively low friction. This does make it possible to lift the lid with one finger, but it also means that when the laptop is open, the upper part (e.g., screen) is not very stable and not suitable for use (particularly if the screen is a touch screen) or while carrying the computer. It has been proposed that a computer could have a hinge whose friction can be varied electronically. When power is applied to the hinge, the friction either increases or decreases.

BRIEF SUMMARY

In summary, one aspect provides an electronic device, comprising: a touch sensitive layer; a main body; a cover; and a hinge connecting the cover and the main body, comprising: a rotary shaft; and an electromechanical coupler that selectively adjusts a rotational resistance of the rotary shaft in response to a signal derived from the touch sensor.

An additional aspect provides a method, comprising: detecting, using a touch sensor, a touch input; and operating, using a control unit, a variable friction hinge to achieve a low friction mode in response to the touch input.

A further aspect provides a program product, comprising: a storage device comprising computer readable program code, the code being executable by a processor and comprising: code that detects, from a touch sensor, a touch input; and code that operates a variable friction hinge to achieve a low friction mode in response to the touch input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1(A-B) shows cross sectional views of an example variable friction hinge.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment provides an intuitive way to control the friction in a variable friction hinge. An embodiment solves the problem of how and when to activate high-friction mode or low-friction mode of a variable friction hinge.

An embodiment provides an electronic touch-sensitive zone or zones that is/are placed on the device, e.g., on the thin side and front edges of the cover (upper or screen half of a laptop). In an embodiment, touch zones are also be placed on the border around the active area of the display screen or panel of the cover (i.e., the B side of the cover) or in a thin border on the back (top surface of the laptop when closed, i.e., the A side of the cover). These touch zones are provided in areas where users naturally touch the cover (upper or screen half) of their laptops to open or close the laptops.

When the laptop is closed, and a user touches the edges of the cover to open the laptop, one or more of the touch zones register the user's touch and a signal is sent to activate a low friction mode of the variable friction hinge. This permits the upper half of the laptop to open very easily. When the user has opened the cover as far as desired, and the user lets go of the cover, either partially (reduces contact points) or totally (releases all contact points), the touch zone registers that the user is no longer touching the cover and a signal is sent to activate a high friction mode of the variable friction hinge. The cover is very stable in the high friction mode, i.e., resistant to movement about the variable friction hinge.

The user experience of opening or closing the laptop while making use of the variable-friction hinge becomes very simple as a result of the touch zones provided on the edges of the cover. This technique requires no additional steps for the user beyond what they usually do to open or close the laptop.

The illustrated example embodiments will be best understood by reference to the figures. The following description is intended only by way of example, and simply illustrates certain example embodiments.

Figure 1A:
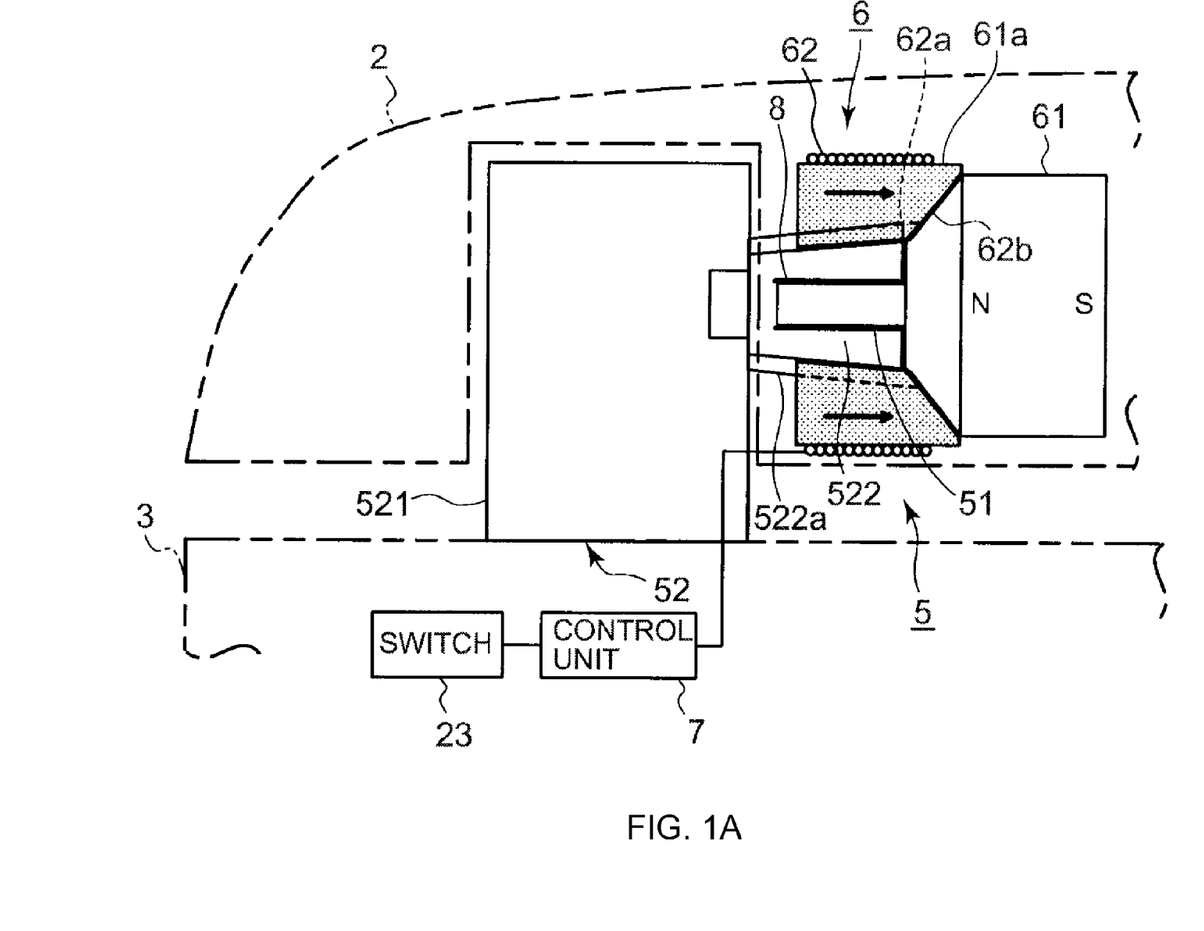
Figure 1B:
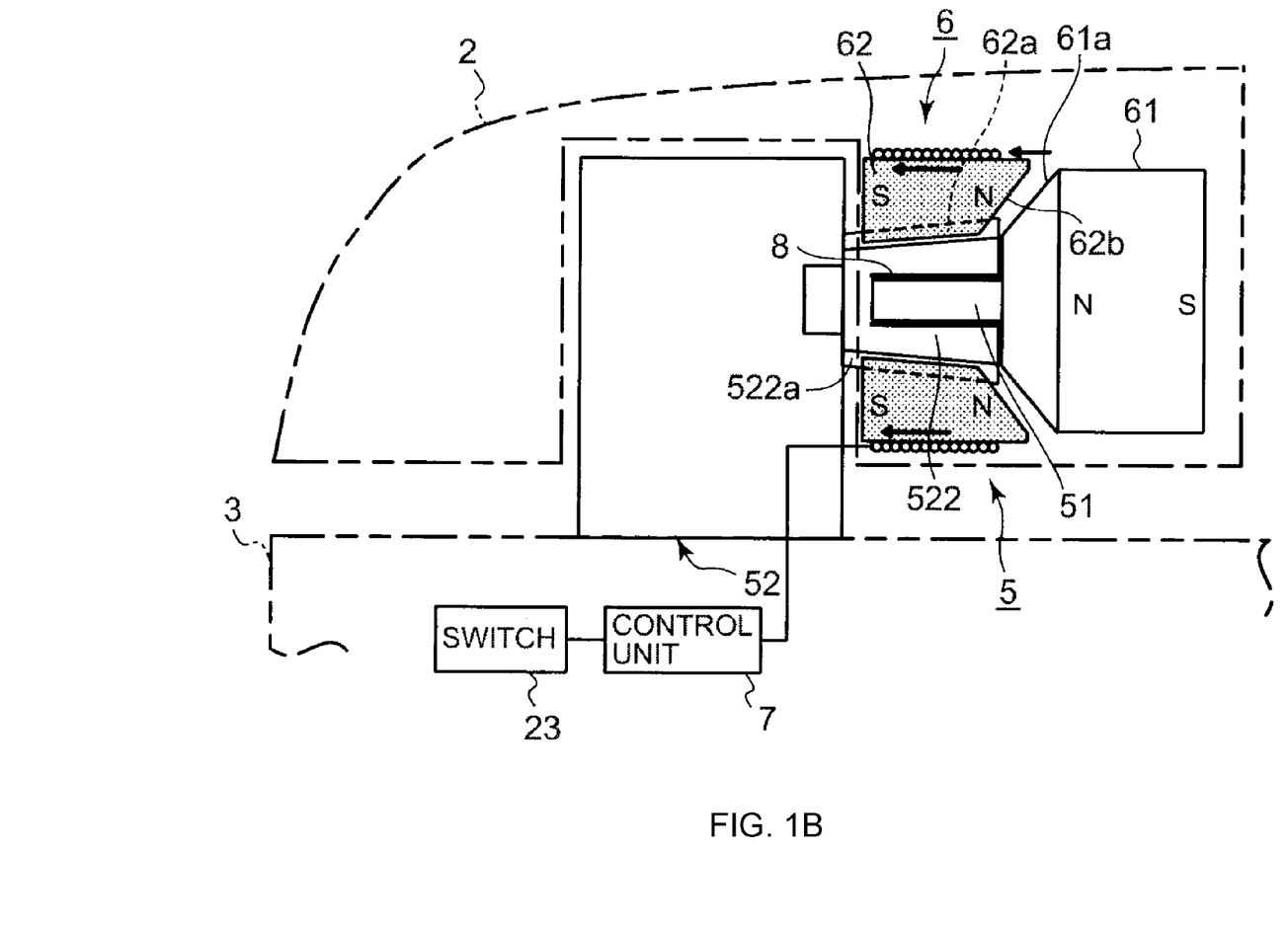

FIG. 1A and FIG. 1B are views showing variable friction hinge of an electronic device such as a laptop computer. FIG. 1A is a view showing a hinge mechanism 5 in a high friction mode and FIG. 1B is a view showing the hinge mechanism 5 in a low friction mode.

The hinge mechanism 5 that engages/disengages movable parts of the variable friction hinge may be implemented by an electromechanical coupler, e.g., an electromagnetic mechanism, as illustrated in FIG. 1A and FIG. 1B. For example, a change in an exciting current by a current control function of a control 7 unit may be provided to the hinge mechanism 5 to move one or more movable parts that increase or decrease the friction of the variable friction hinge.

As illustrated in FIG. 1A and FIG. 1B, the electronic device is provided with a hinge mechanism 5 for connecting a cover 2 to a main body 3, where the hinge mechanism 5 includes an electromagnetic mechanism 6 for controlling an opening/closing torque of the hinge mechanism 5.

The hinge mechanism 5 has a rotary shaft 51 incorporated into the cover 2 and a support member 52 incorporated into the main body 3. A frictional resistance imparting portion 8 for giving on the rotary shaft 51 the opening/closing torque acting on the cover 2 by way of frictional resistance may be provided to the hinge mechanism 5.

The support member 52 includes an attachment base 521 fixed to the main body 3 and a bearing portion 522 fixed to the attachment base 521 in which the rotary shaft 51 is rotatably inserted.

The electromagnetic mechanism 6 has a configuration in which a permanent magnet 61 is fixed to a fixed end of the rotary shaft 51 so that two different magnetic poles are arranged along an axial direction of the rotary shaft 51, and the electromagnet 62 is provided to the bearing portion 522 of the support member 52 so that it can reciprocate along the axial direction of the rotary shaft 51.

The permanent magnet 61 generally may take the form of a columnar shape having a diameter larger than that of the rotary shaft 51 and a portion thereof near the rotary shaft 51 has a truncated cone shape formed by a sloped surface 61a that is gradually narrowed as it goes toward the rotary shaft 51. Two magnetic poles north (N) and south (S) of the permanent magnet 61 are defined such that a north (N) pole is directed toward the rotary shaft 51, for example.

The electromagnet 62 is fitted to the support member 52. The fitting portion is configured by a convex portion 522a formed on the bearing portion 522 of the support member 52 and a concave portion 62a formed on the electromagnet 62 to be fitted with the convex portion 522a of the bearing portion 522. The electromagnet 62 has approximately the same diameter as an outer diameter of the permanent magnet 61 and a funnel-shaped sloped surface 62b having the same inclination as the sloped surface 61a of the permanent magnet 61 is formed at a portion thereof near the permanent magnet 61.

An electronic device having the hinge mechanism 5 and the electromagnetic mechanism 6 is provided with a control unit 7 for controlling the electromagnet 62 by way of an exciting current. By controlling the exciting current to the electromagnet 62 using the control unit 7, it is possible to switch the generation of an attractive force and a repulsive force by the electromagnet 62 and the permanent magnet 61. Moreover, by varying the proportion of the attractive force and the repulsive force by the electromagnet 62 and the permanent magnet 61, it is possible to generate a variable opening/closing torque to the rotary shaft 51.

Figure 1C:
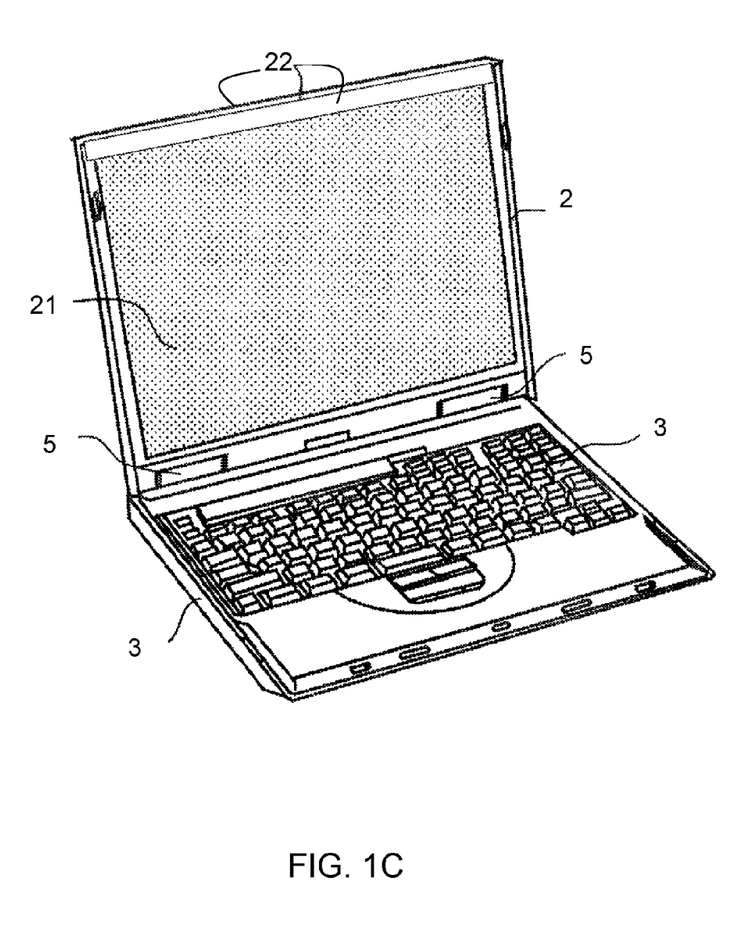
FIG. 1C illustrates a device including a plurality of touch sensors.

Referring to FIG. 1C, the cover 2 is provided with a touch sensitive layer 22 or layers (or other touch sensor(s)) for sensing when the user has contacted the cover 2 to open or close the cover 2 with respect to the main body 3. For example, an input from the touch sensitive layer 22 provides a control signal to the control unit 7, i.e., activates an electromagnet excitation switch 23 to move movable parts of the electromagnetic mechanism 6.

FIG. 1C illustrates that touch sensing layers 22 may be included in the cover 2 in various areas. By way of specific example, touch sensing layers 22 may be provided in a bottom surface area (B side of the cover 2) located above a display screen 21 (e.g., LCD panel) and on the side margin of the cover 2 (i.e., topmost edge of the cover 2). Other touch sensing layers may be included, e.g., on a top of the cover 2 (A side of the cover 2, not visible in FIG. 1C).

The touch sensing layer or layers 22 may be monitored or powered for a predetermined time or be turned on or off according to various policies. For example, in order to conserve power, the touch sensing layer or layers 22 may be powered off when the cover 2 is closed. The touch sensing layer or layers 22 may be powered on in response to a particular input, e.g., input from an accelerometer indicating that a user has moved the device. As a further example, the touch sensing layer or layers 22 may be powered on or off in response to a sensor input (e.g., gyroscope input), e.g., indicating that a user has placed the device on a table or desk. Moreover, the touch sensing layer or layers 22 may be powered off or rendered unresponsive to touch input following a timeout. For example, if a user contacts a touch sensing layer 22 for more than a predetermined amount of time, the touch sensing layer may cease to provide a touch detection signal to the control unit 7.

Referring back to FIG. 1A and FIG. 1B, a biased position is illustrated in FIG. 1A, where the resting state of the hinge mechanism 5 is the high friction mode. This high friction mode may be maintained by removing an electromagnet excitation signal, via the electromagnet excitation switch 23, which normally provides polarity to the electromagnet 62 and produces a repulsive force between the electromagnet 62 and the permanent magnet 61. Thus, when the cover 2 is closed or opened for use in a stable position, and no touch is detected by a touch sensitive layer 22, the electromagnetic excitation signal is not provided by the electromagnet excitation switch 23.

However, when a touch sensitive layer 22 detects an object, e.g., a human finger, a human hand, etc., is proximate thereto or touching the touch sensitive layer 22, the electromagnet excitation switch 23 operates to provide polarity to the electromagnet 62 and create a repulsive force between the electromagnet 62 and the permanent magnet 61. Thus, the hinge mechanism 5 enters the low friction mode and the variable friction hinge is easily moved. Specifically, in conjunction with a touching of a touch sensitive layer 22, e.g., when the cover 2 is touched in preparation for opening or closing, the repulsive force is generated between the permanent magnet 61 and the electromagnet 62, and it is possible to easily rotate the cover 2, i.e., the friction variable hinge enters a low friction mode from the high friction mode in response to a signal from a touch sensitive layer 22.

Furthermore, the control unit 7 may have a current control function of lowering a current value of the exciting current to zero or increasing it to a predetermined amount within a predetermined period of time when an input of the electromagnet excitation signal from the electromagnet excitation switch 23 is supplied or stopped, e.g., as triggered by touch sensing using a touch sensitive layer 22. By providing the current control function to the control unit 7, when an operator ceases contact with a touch sensitive layer 22, the exciting current of the electromagnet 62 is decreased (or increased, depending on the polarity of the magnetic mechanism 6 set up), and thus, the repulsive or attractive forces against the permanent magnet 61 change. As a result, the frictional resistance changes, e.g., the variable friction hinge enters a high friction mode, and it is thus possible to change the opening/closing torque to the rotary shaft 51 smoothly over time. The amount of electromagnetic excitation signal may be varied over time, e.g., based on a number of contacts sensed by a touch sensitive layer 22, for example. Owing to such a configuration, the opening/closing torque changes as the cover 2 is placed into a desired opening/closing angle, and it is possible to realize a smooth and delicate opening/closing operation.

The opening/closing torque can be increased by increasing an area of a contacting surface between the truncated cone-shaped sloped surface 61a of the permanent magnet 61 and the funnel-shaped sloped surface 62b of the electromagnet 62. This again may be modulated based on a number of contacts sensed by a touch sensitive layer 22 or similar metric, e.g., an area of contact.

When a current is not applied to the electromagnet 62, the electromagnet 62 is moved on the bearing portion 522 in the axial direction of the rotary shaft 51 to be attached to the permanent magnet 61, and thus, the rotary shaft 51 is fixed at a high friction state where it is not easily rotatable (FIG. 1A). Therefore, the opening/closing torque by the electromagnetic mechanism 6 becomes the maximum.

When a touch sensitive layer 22 is contacted in order to open or close the cover 2, the electromagnet excitation switch 23 is turned on, and thus, the electromagnet excitation signal is delivered from the electromagnet excitation switch 23 to the control unit 7. Then, the control unit 7 puts the electromagnet 62 into a state where a current is applied thereto in response to the input of the electromagnet excitation signal. When a current is applied to the electromagnet 62, a force is generated in a direction where the magnetic poles of the electromagnet 62 and the magnetic poles of the permanent magnet 61 repel each other. Therefore, the electromagnet 62 is moved on the bearing portion 522 in the axial direction of the rotary shaft 51 to be separated from the permanent magnet 61. As a result, it is possible to allow the rotary shaft 51 to be in a rotatable state (FIG. 1B). In this case, since the opening/closing torque by the electromagnetic mechanism 6 becomes the minimum, it is possible to easily lift up the cover 2 to be opened. Therefore, it is possible to prevent an occasion in which the main body 3 is lifted up together with the cover 2 by an operating force for opening the cover 2.

When a touch sensitive layer 22 is released at a time point when the opening angle of the cover 2 approaches a desired angle, which may be actively sensed for example via an angular rotation sensor, since the input of the electromagnet excitation signal from the electromagnet excitation switch 23 is reduced or stopped, the control unit 7 lowers or stops the current within a predetermined period of time by way of the current control function, with or without modulation with respect to a number or area of contacts sensed by touch sensing layer 22. Owing to the current control function, the exciting current of the electromagnet 62 is decreased or stopped, and thus, the repulsive force against the permanent magnet 61 weakens while the attractive force between them strengthens. As a result, the frictional resistance increases, and it is thus possible to increase the opening/closing torque to the rotary shaft 51 in a proportional manner. Owing to such a configuration, since the opening/closing torque increases as the cover 2 moves closer to a desired opening angle and/or the number or area of contact points decreases, it is possible to realize a smooth and delicate opening/closing operation. Moreover, it is possible to stop the cover 2 at a desired opened position to be held at a time point when the opening/closing torque becomes the maximum.

It is noted herein that although in an embodiment described and illustrated in connection with FIG. 1A and FIG. 1B, the electromagnet excitation switch 23 for delivering the electromagnet excitation signal to the control unit 7 operates in conjunction with a touch sensitive layer 22 disposed on a surface the cover 2, there may be alternative or additional touch sensitive layers or touch sensors provided, having different touch sensing functions or different locations, or both, as further described herein. Furthermore, the use of the example of an electromechanical coupler in the form of an electromagnetic mechanism 6 is simply to offer an example that is suitable. Other electromechanical couplers may be employed, e.g., a mechanism that employs moving parts that respond to touch input and vary the friction of the hinge(s). Furthermore, although focus has been given in the examples to touch sensors provided in the cover 2 of a device, touch sensor(s) may be positioned in the main body of the device.

Figure 2:
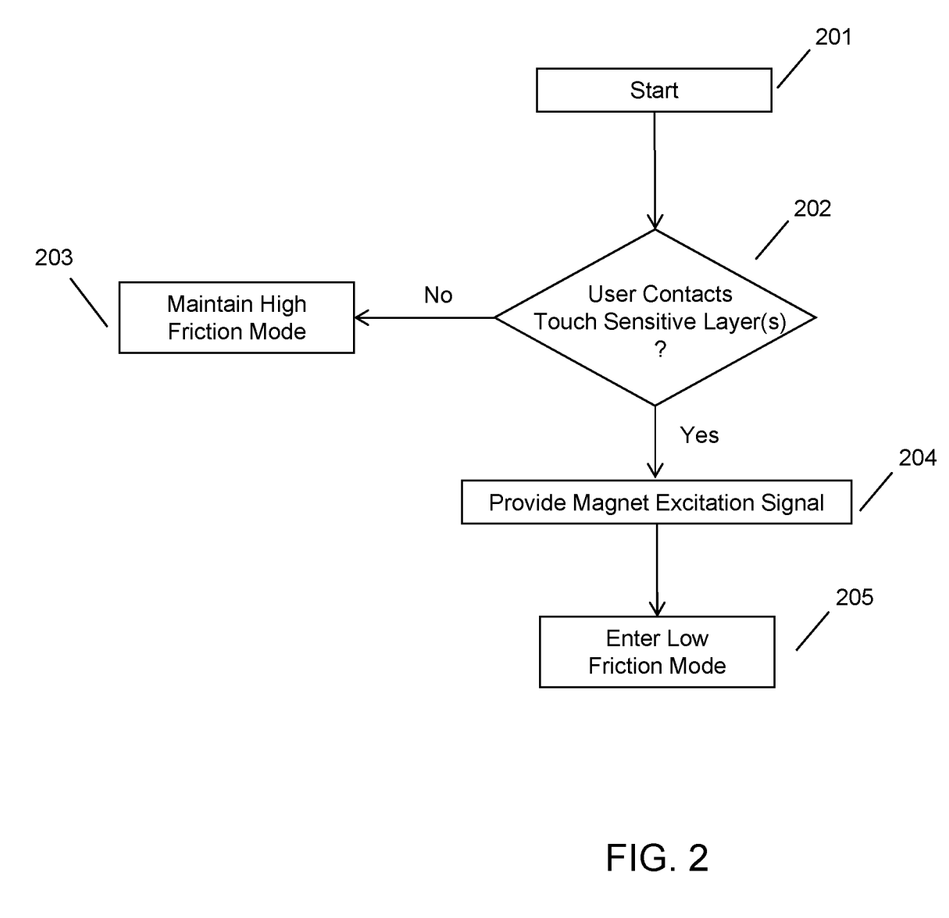
FIG. 2 shows an example method of operating a variable friction hinge in response to touch input.

FIG. 2 illustrates an example method of operating a variable friction hinge according to an embodiment. As illustrated, at the start 201, if touch sensitive layer, e.g., a capacitive or resistive sensing touch sensing layer, senses (has its capacitance or conductivity changed by) an object such as a human finger, as determined at 202, an embodiment operates the switch 23 and control unit 7 to provide a magnet excitation signal, as illustrated at 204, and the low friction mode is achieved, as illustrated at 205. For example, an electromagnet 62 may be powered to provide polarity and repulsive force, separating it from a permanent magnet 61 provided in a hinge mechanism 5 and achieving a low friction state or mode.

In an embodiment, the sensing or determining performed at 202 may include determining that a particular user has contacted the touch sensing layer 22 or other touch sensor. For example, an embodiment may include a biometric identification function such that a particular, known user is detected at 202, e.g., in response to touching a touch sensitive layer 22 in particular area (e.g., upper right corner). In one embodiment, for example, a touch sensitive layer 22 may provide fingerprint data to a biometric subsystem. The biometric subsystem may filter out touch contacts from unrecognized users such that the variable friction hinge mechanism may act as a cover lock for the device, e.g., by maintaining a high friction state. If a user is properly identified, the biometric subsystem may permit the touch contact detection mechanism to proceed, i.e., permitting the variable friction hinge mechanism to achieve a low friction state or mode.

Therefore, if no contact signal is sent from a touch sensitive layer 22, or if no contact signal from the touch sensitive layer 22 is permitted to proceed, as determined at 202, the high friction mode may be maintained, as illustrated at 203.

The various embodiments provide a convenient mechanism for varying the friction of a variable friction hinge of an electronic device. As described herein, this operation may be in response to a signal such as that provided by a touch sensing layer or other touch sensor (including simple contact sensors). The variable friction hinge may be provided as a pair of variable friction hinges that secure a lid or cover of a clamshell style laptop. The variable friction hinge may be included in a single hinge device, e.g., such as a convertible device that achieves various physical conformations by rotating a lid about a single, multi-axis hinge.

Figure 3:
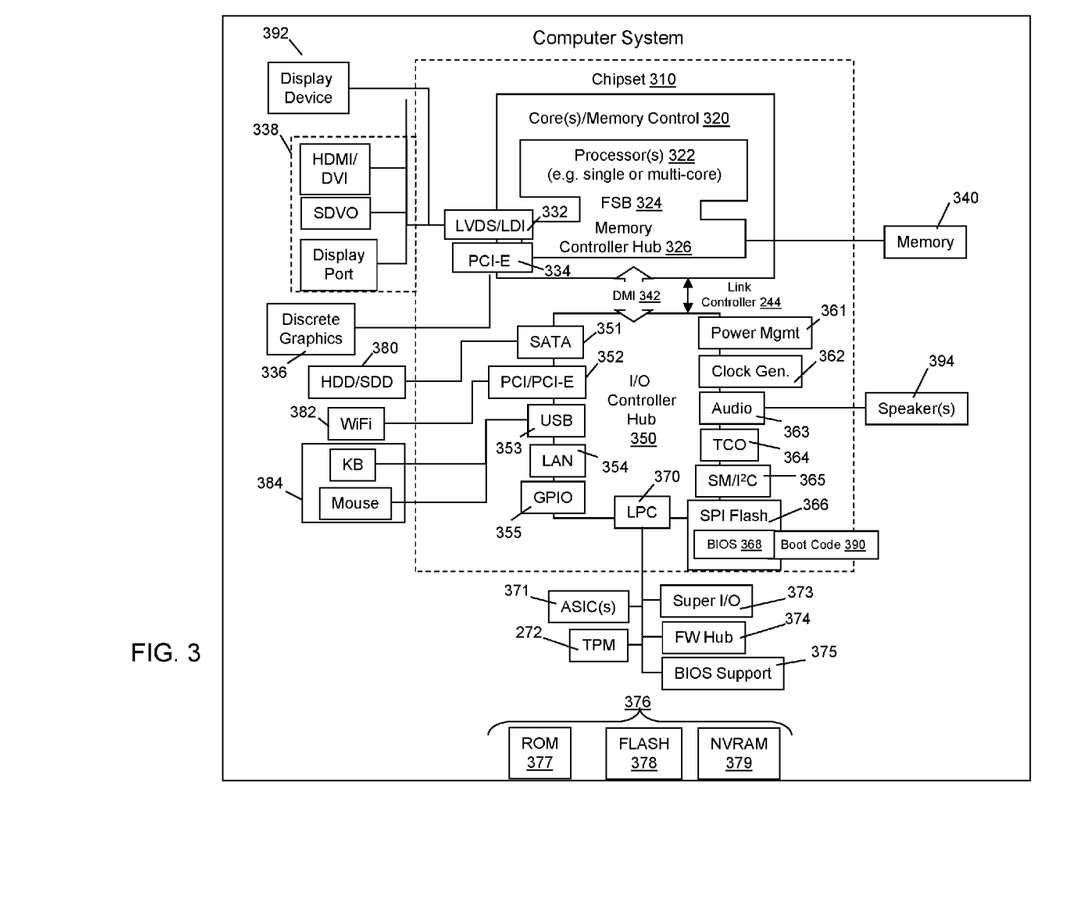
FIG. 3 shows an example of electronic device circuitry.

Turning to FIG. 3, while various other circuits, circuitry or components may be utilized in electronic devices, FIG. 3 depicts a block diagram of an example of information handling device circuits, circuitry or components. The example depicted in FIG. 3 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 3.

The example of FIG. 3 includes a so-called chipset 310 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 310 includes a core and memory control group 320 and an I/O controller hub 350 that exchanges information (for example, data, signals, commands, etc.) via a direct management interface (DMI) 342 or a link controller 344. In FIG. 1, the DMI 342 is a chip-to-chip interface (sometimes referred to as being a link between a "northbridge" and a "southbridge"). The core and memory control group 320 include one or more processors 322 (for example, single or multi-core) and a memory controller hub 326 that exchange information via a front side bus (FSB) 324; noting that components of the group 320 may be integrated in a chip that supplants the conventional "northbridge" style architecture. One or more processors 322 comprise internal arithmetic units, registers, cache memory, busses, I/O ports, etc., as is well known in the art.

In FIG. 3, the memory controller hub 326 interfaces with memory 340 (for example, to provide support for a type of RAM that may be referred to as "system memory" or "memory"). The memory controller hub 326 further includes a low voltage differential signaling (LVDS) interface 332 for a display device 392 (for example, a CRT, a flat panel, touch screen, etc.). A block 338 includes some technologies that may be supported via the LVDS interface 332 (for example, serial digital video, HDMI/DVI, display port). The memory controller hub 326 also includes a PCI-express interface (PCI-E) 334 that may support discrete graphics 336.

In FIG. 3, the I/O hub controller 350 includes a SATA interface 351 (for example, for HDDs, SDDs, etc., 380), a PCI-E interface 352 (for example, for wireless connections 382), a USB interface 353 (for example, for devices 384 such as a digitizer, keyboard, mice, cameras, phones, microphones, storage, biometric data capture device, other connected devices, etc.), a network interface 354 (for example, LAN), a GPIO interface 355, a LPC interface 370 (for ASICs 371, a TPM 372, a super I/O 373, a firmware hub 374, BIOS support 375 as well as various types of memory 376 such as ROM 377, Flash 378, and NVRAM 379), a power management interface 361, a clock generator interface 362, an audio interface 363 (for example, for speakers 394), a TCO interface 364, a system management bus interface 365, and SPI Flash 366, which can include BIOS 368 and boot code 390. The I/O hub controller 350 may include gigabit Ethernet support. USB interface 353 may include a physical port 353a, e.g., into which a connectable or pluggable storage device is placed.

The system, upon power on, may be configured to execute boot code 390 for the BIOS 368, as stored within the SPI Flash 366, and thereafter processes data under the control of one or more operating systems and application software (for example, stored in system memory 340). An operating system may be stored in any of a variety of locations and accessed, for example, according to instructions of the BIOS 368. As described herein, a device may include fewer or more features than shown in the system of FIG. 3.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
    a touch sensor;
    a main body;
    a cover; and
    a hinge connecting the cover and the main body, comprising:
        a rotary shaft; and
        an electromechanical coupler that selectively adjusts a rotational resistance of the rotary shaft in response to a signal derived from the touch sensor, wherein the touch sensor comprises a touch sensitive layer and is coupled to the cover.

2. The electronic device of claim 1, wherein the touch sensitive layer is disposed in an outer surface of the cover.

3. The electronic device of claim 1, wherein the touch sensitive layer is disposed in a bottom surface of the cover.

4. The electronic device of claim 1, wherein the touch sensitive layer is disposed in a top surface of the cover.

5. The electronic device of claim 1, wherein the touch sensitive layer is disposed in a side surface of the cover.

6. The electronic device of claim 1, wherein the touch sensor comprises a plurality of touch sensitive layers.

7. The electronic device of claim 6, wherein at least one of the plurality of touch sensitive layers is disposed in the main body.

8. The electronic device of claim 6, wherein at least one of the plurality of touch sensitive layers is disposed about a periphery of a display screen disposed within the cover.

9. The electronic device of claim 1, wherein the electromechanical coupler adjusts the rotational resistance in response to a detection of a predetermined user.

10. A method, comprising:
    detecting, using a touch sensor, a touch input, wherein the detecting comprises detecting the touch input while the lid is in a closed state; and
    operating, using a control unit, a variable friction hinge to achieve a low friction mode in response to the touch input.

11. The method of claim 10, wherein the detecting comprises detecting a contact input.

12. The method of claim 10, wherein the detecting comprises detecting a biometric input.

13. The method of claim 12, wherein the biometric input comprises fingerprint data.

14. The method of claim 10, wherein:
    the detecting comprises detecting a number of touch inputs; and
    the operating comprises variably adjusting the variable friction hinge based on the number of touch inputs.

15. The method of claim 10, wherein:
    the detecting comprises detecting the touch input for less than a predetermined time.

16. The method of claim 10, wherein the operating comprises providing an electromagnet excitation signal.

17. A program product, comprising:
    a storage device comprising computer readable program code, the code being executable by a processor and comprising:
    code that detects, from a touch sensor, a touch input, wherein the code that detects comprises code that detects the touch input while the lid is in a closed state: and
    code that operates a variable friction hinge to achieve a low friction mode in response to the touch input.

* * * * *